(12) United States Patent
Hartsfield, Jr.

(10) Patent No.: US 7,009,319 B2
(45) Date of Patent: Mar. 7, 2006

(54) CONTROLLING ELECTRIC MOTOR COGGING

(75) Inventor: Richard E. Hartsfield, Jr., St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/872,751

(22) Filed: Jun. 21, 2004

(65) Prior Publication Data

US 2005/0040722 A1    Feb. 24, 2005

Related U.S. Application Data

(62) Division of application No. 10/337,835, filed on Jan. 7, 2003, now Pat. No. 6,753,632.

(51) Int. Cl.
*H02K 1/27* (2006.01)

(52) U.S. Cl. .......................... 310/156.38; 310/156.01; 310/156.45; 310/156.46; 310/156.49; 310/261

(58) Field of Classification Search ............... 310/51, 310/156.01, 156.38, 156.43, 156.45, 156.46, 310/156.48, 156.49, 261
See application file for complete search history.

(56) References Cited

U.S. PATENT DOCUMENTS

| | | | |
|---|---|---|---|
| 5,990,592 A * | 11/1999 | Miura et al. ............ | 310/156.53 |
| 6,858,960 B1 * | 2/2005 | Muszynski ............. | 310/156.47 |
| 2003/0080642 A1 * | 5/2003 | Mori et al. ............ | 310/156.57 |
| 2004/0027024 A1 * | 2/2004 | Kato et al. .................. | 310/179 |

* cited by examiner

*Primary Examiner*—Burton S. Mullins
*Assistant Examiner*—David W. Scheuermann
(74) *Attorney, Agent, or Firm*—Harness, Dickey & Pierce, P.L.C.

(57) ABSTRACT

A method of determining magnet pole geometry for controlling cogging in an electric motor includes defining the magnet pole geometry in terms of at least one design parameter, predicting cogging as a function of the design parameter, and from the predicted cogging, selecting a value for the design parameter which corresponds to a desired level of cogging in the electric motor.

5 Claims, 9 Drawing Sheets

FEA-Predicted Cogging For 26 mdeg BetaM and Various Rmo

FEA-Predicted Cogging For 29 mdeg BetaM and Various Rmo

FEA-Predicted Cogging For 32 mdeg BetaM and Various Rmo

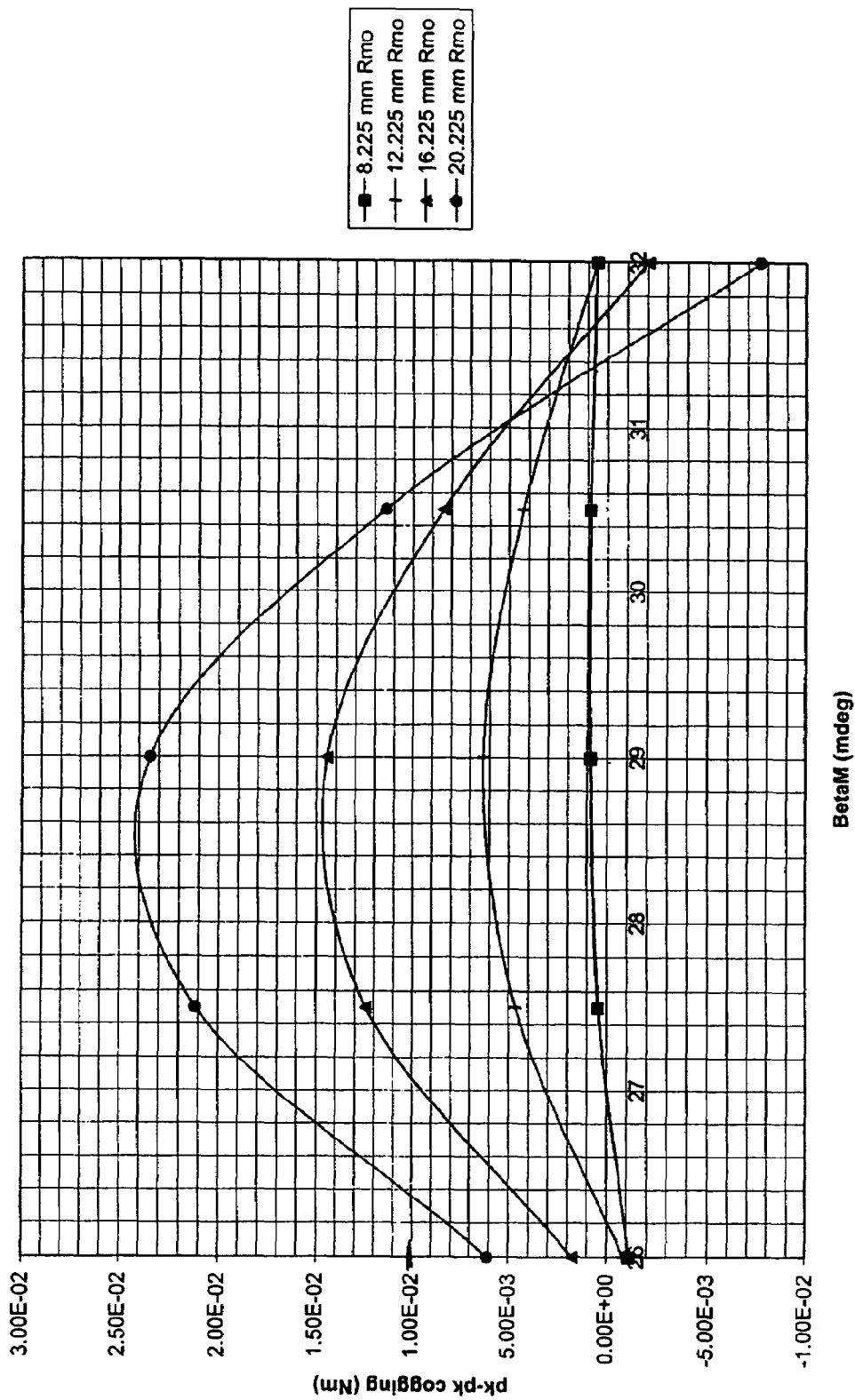

CONTROLLING ELECTRIC MOTOR COGGING

CROSS REFERENCE TO RELATED APPLICATION

This application is a divisional of U.S. application Ser. No. 10/337,835 filed Jan. 7, 2003, now U.S. Pat. No. 6,753,632, the entire disclosure of which is incorporated herein by reference.

FIELD OF THE INVENTION

The present invention relates generally to electric motors and, more particularly, to controlling cogging in electric motors.

BACKGROUND OF THE INVENTION

Many electromagnetic machines in general, and permanent magnet electric motors in particular, exhibit torque irregularities as the rotor rotates with respect to the stator. Such irregularities produce non-uniform torque output and, thus, non-uniform rotation of the rotor. These torque irregularities may be caused by the physical construction of a given machine. They can result from, for example, a bearing that sticks in a given rotor position or the fact that, because of the electromagnetic characteristics of the machine, the rotor tends to prefer certain angular positions with respect to the stator. Torque irregularities resulting from the electromagnetic characteristics of a permanent-magnet machine are commonly known as torque ripple, and the component that is present even when the stator windings are not energized is known as "cogging".

Because cogging is generally undesirable for certain electric motor applications, including automotive power steering applications, techniques have been explored to reduce cogging. For example, optimization techniques have been applied to identify magnet pole geometries that yield reduced cogging. As recognized by the inventor hereof, however, these known techniques do not predict cogging in an electric motor as a function of the magnet pole geometry, and therefore do not facilitate the selection of design parameter values which yield a desired level of cogging in the electric motor.

SUMMARY OF THE INVENTION

The inventor hereof has succeeded at designing a method of determining magnet pole geometry for controlling cogging in an electric motor. The method includes defining the magnet pole geometry in terms of at least one design parameter, predicting cogging as a function of the design parameter, and, from the predicted cogging, selecting a value for the design parameter which corresponds to a desired level of cogging in the electric motor.

While some of the principal features and advantages of the invention have been described above, a greater and more thorough understanding of the invention may be attained by referring to the drawings and the detailed description of exemplary embodiments which follow.

BRIEF DESCRIPTION OF THE DRAWINGS

FIG. 8 is a plot of predicted peak-to-peak cogging produced from the data of FIGS. 3–7.

Corresponding reference characters indicate corresponding features throughout the several views of the drawings.

DETAILED DESCRIPTION OF EXEMPLARY EMBODIMENTS

Figure 1:
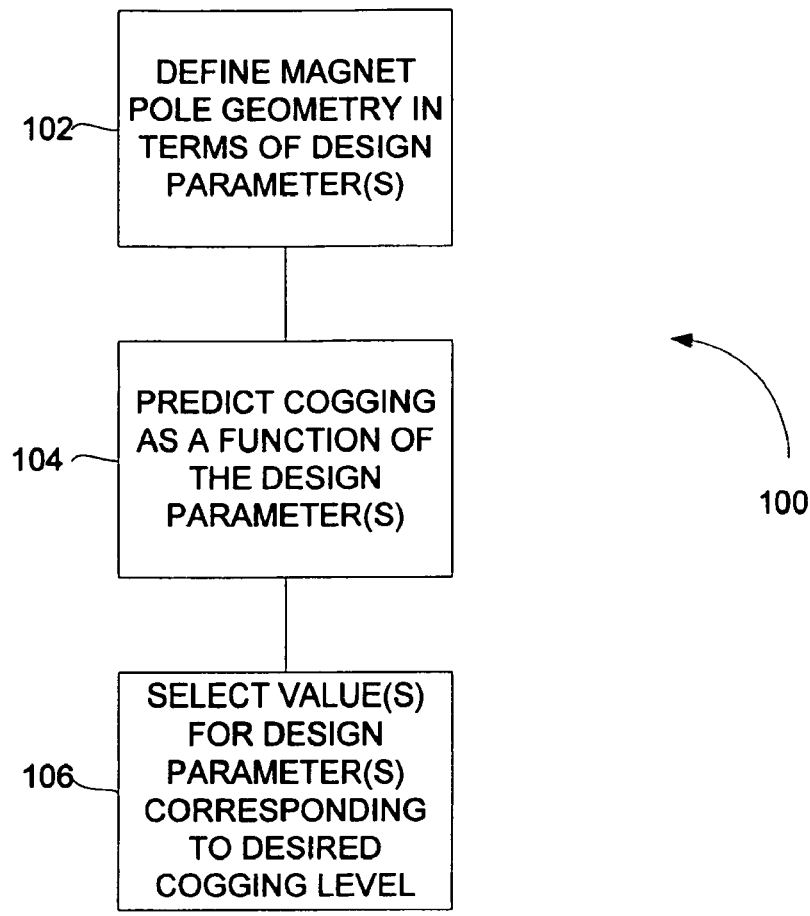
FIG. 1 is a flow diagram of a method of determining magnet pole geometry for controlling cogging in an electric motor according to one embodiment of the present invention.
Figure 9:
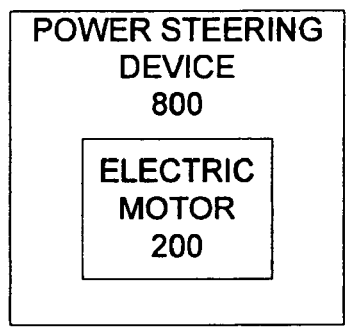
FIG. 9 is a block diagram of a power steering device incorporating the electric motor of FIG. 2.

A method of determining magnet pole geometry for controlling cogging in an electric motor according to one exemplary embodiment of the present invention is illustrated in FIG. 1 and indicated generally by reference numeral 100. As shown in FIG. 1, the method 100 includes the step 102 of defining the magnet pole geometry in terms of at least one design parameter. The method 100 further includes the step 104 of predicting cogging as a function of the design parameter. At step 106, the predicted cogging is used to select a value for the design parameter which corresponds to a desired level of cogging in the electric motor. For example, in the case of an electric motor application in which cogging is generally undesirable, the predicted cogging can be used to select a value for the design parameter which corresponds to a minimum or zero cogging value for the electric motor. Alternatively, the predicted cogging can be used to select a design parameter value which will yield a higher cogging value for the electric motor, if desired.

The design parameter referred to in step 102 of FIG. 1 may be any parameter which defines the magnet pole geometry (i.e., the size and/or shape of the magnet pole), and whose value can be selected or optimized as desired. Additionally, the magnet pole geometry can be defined in terms of multiple design parameters instead of a single design parameter. In such a case, cogging is preferably predicted as a function of the multiple design parameters, and this predicted cogging is then used to select values for the design parameters which correspond to a desired level of cogging in the electric motor.

With further reference to step 104 in FIG. 1, cogging is predicted in one embodiment of the invention using a finite elements analysis (FEA) model of the electric motor, although other means for predicting cogging can be employed. Further, the cogging which is predicted in one embodiment is peak-to-peak cogging (also referred to as cogging magnitude), although this is not strictly necessary.

One exemplary implementation of the method 100 shown in FIG. 1 will now be described with reference to FIGS. 2–8. This particular implementation is for a 10 pole/12 slot brushless permanent magnet (BPM) motor 200, which is illustrated generally in FIG. 2(a). It should be understood, however, that the method 100 can be applied to other pole/slot combinations, as well as to other types of electric motors.

Figure 2A:
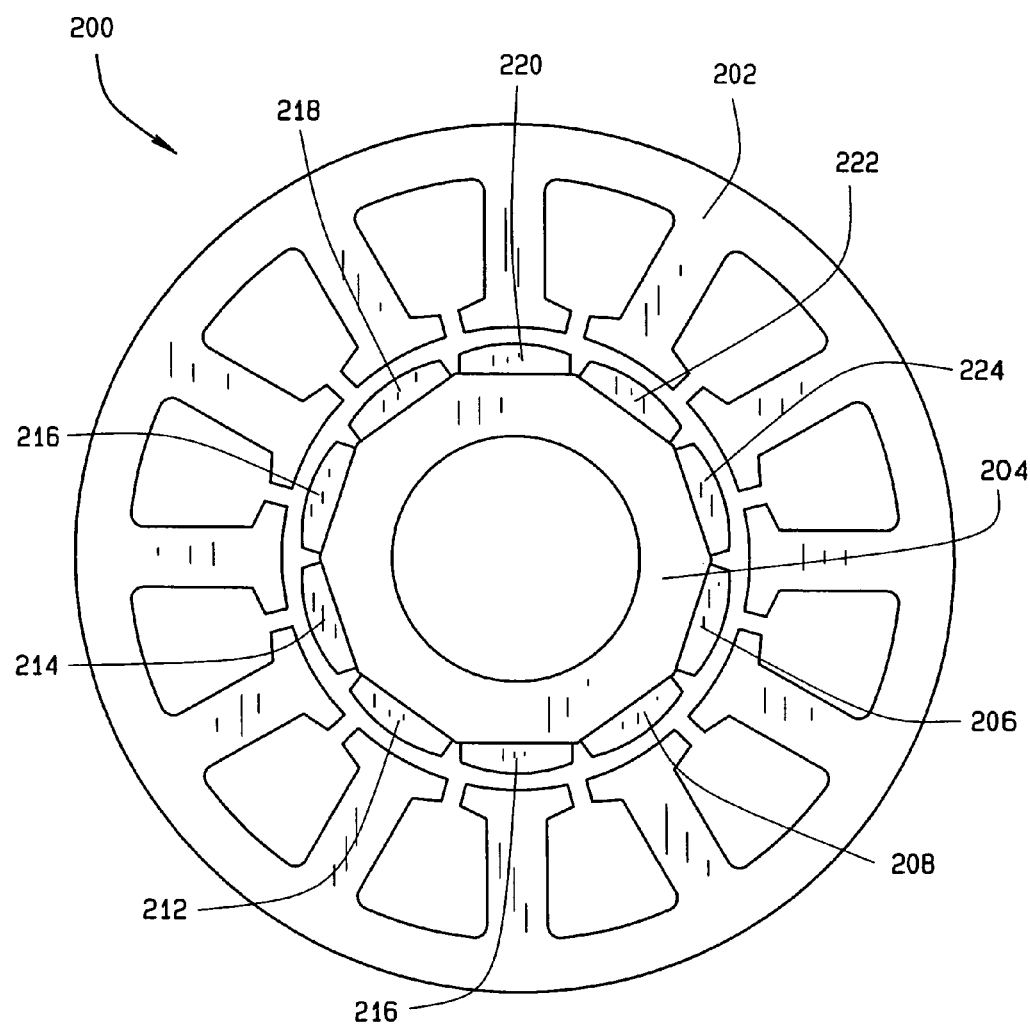
FIG. 2(a) illustrates an electric motor having a rotor with a magnet pole geometry determined using the method of FIG. 1.
Figure 2B:
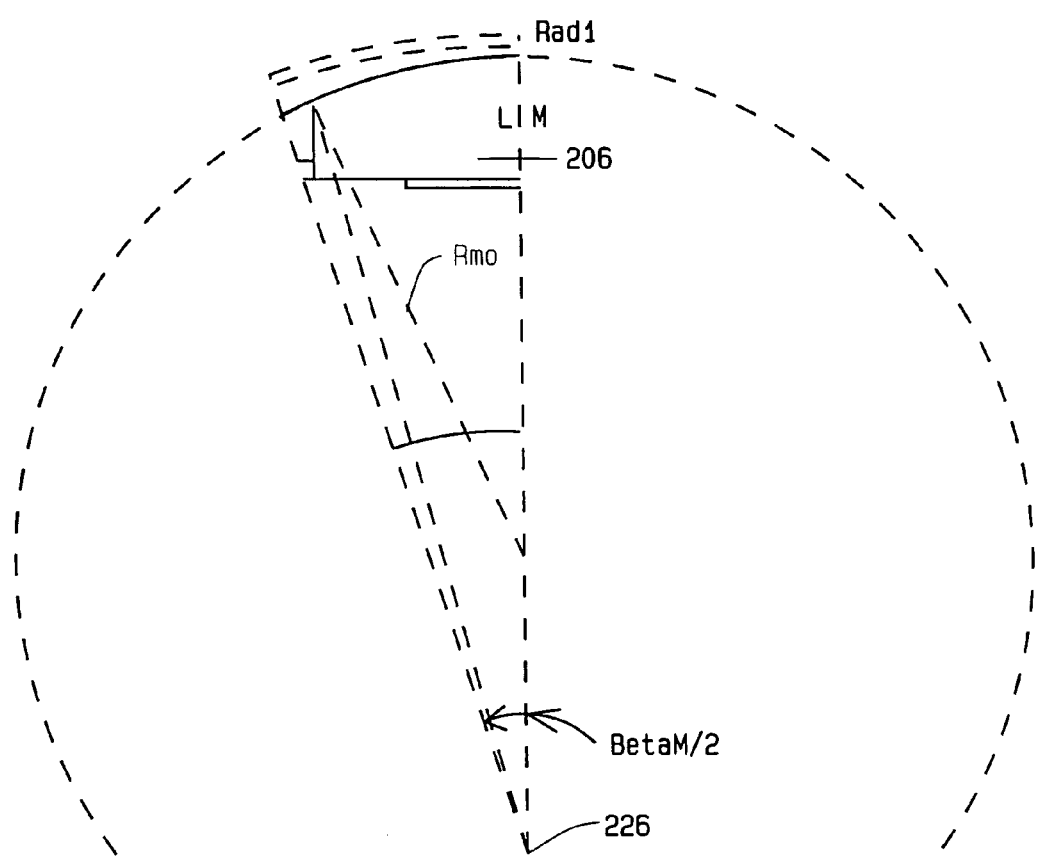
FIG. 2(b) further illustrates the magnet pole geometry of the rotor shown in FIG. 2(a)

As shown in FIG. 2(a), the motor 200 includes a stator 202 and a rotor 204 positioned within the stator 202. The rotor 204 includes several magnet poles 206–224, with each magnet pole having the same geometry. Alternatively, the rotor 204 can be designed such that two or more of its magnet poles have a different geometry, but this will increase the complexity of the design. As best shown in FIG. 2(b), the geometry of each magnet pole 206–224 in this particular embodiment is defined by two design parameters, namely, the magnet pole span BetaM, which defines the angular width of each magnet pole, and the magnet decenter radius Rmo, which defines the degree of curvature for each magnet pole. Alternatively (or additionally), the magnet pole geometry can be defined, e.g., in terms of a polynomial function. FIG. 2(b) also illustrates the parameter Rad1, which represents the outside diameter of the rotor 204.

In this particular implementation, the cogging of the electric motor 200 shown in FIG. 2 will be predicted using a parametric FEA model of the motor 200 as well as predefined potential values for the design parameters BetaM and Rmo. These potential values can be defined as discrete values or, more preferably, as value ranges that can realistically be used for BetaM and Rmo in the given motor configuration. For purposes of this example, assume the value of BetaM can range from 26 to 32 mechanical degrees, and the value of Rmo can range from 8.225 to 20.225 millimeters. As appreciated by those skilled in the art, the parametric FEA model of the electric motor can be produced using any suitable FEA software.

Figure 3:
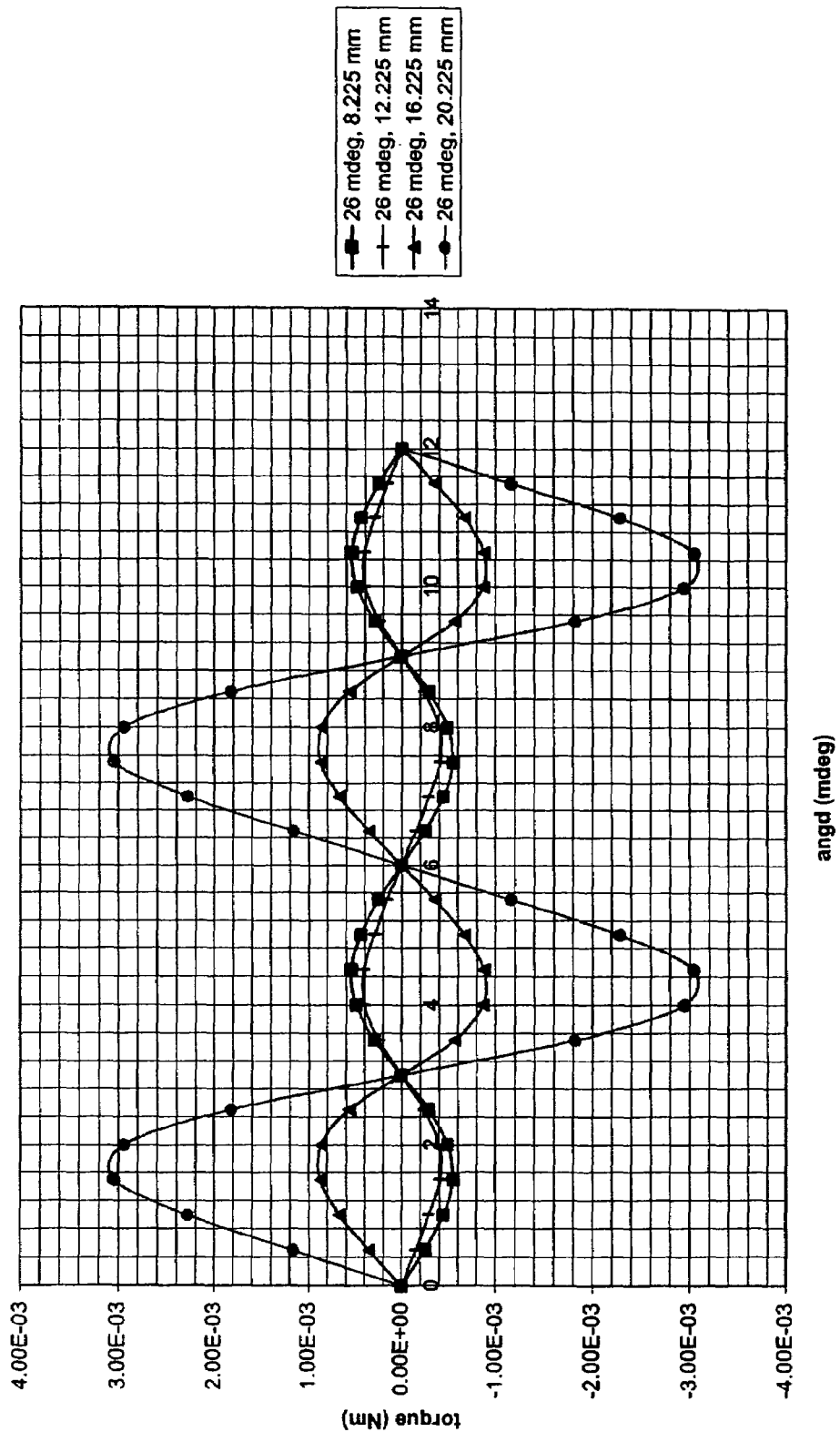
FIGS. 3–7 are predicted cogging plots produced for the electric motor of FIG. 2 using an FEA model.
Figure 4:
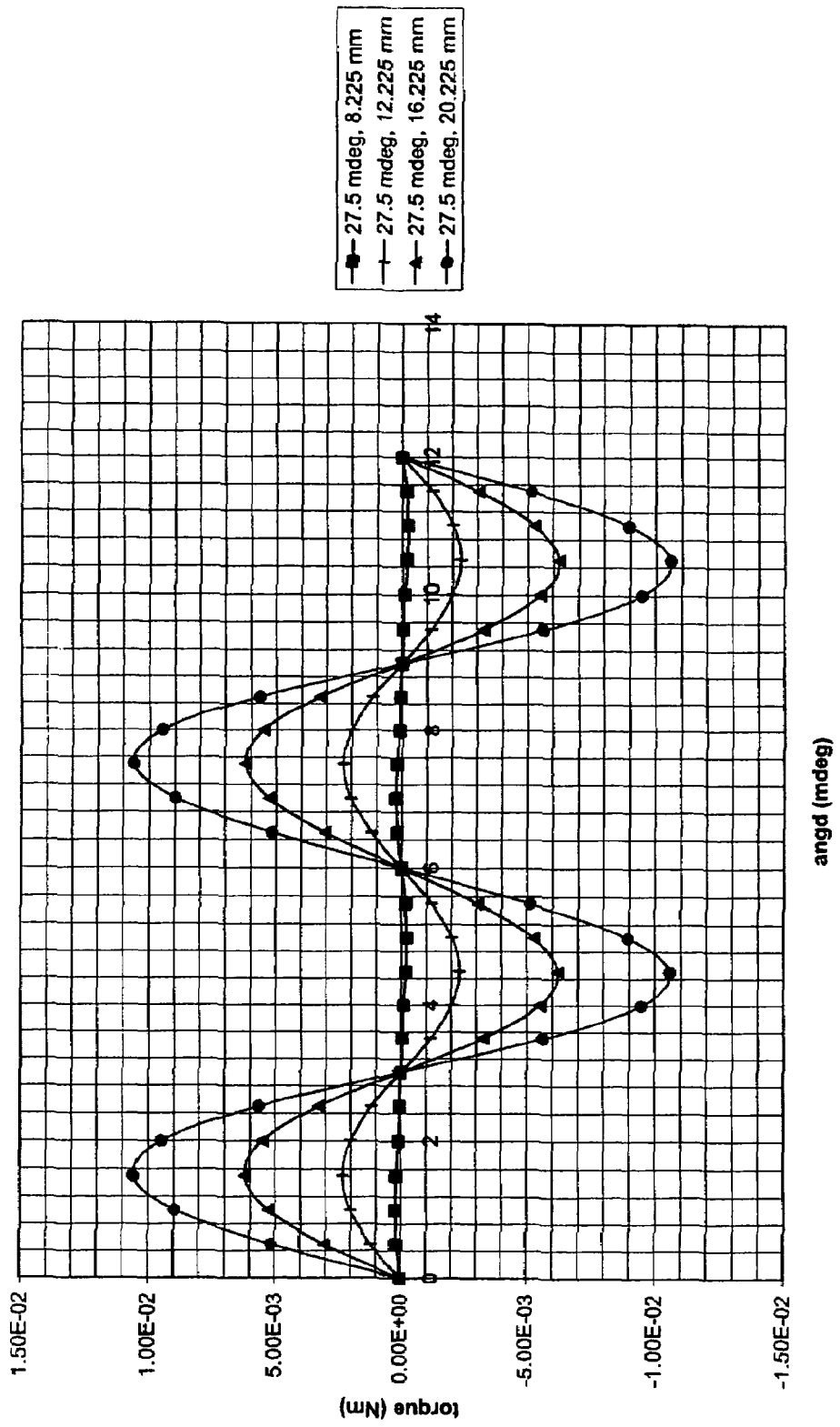
Figure 5:
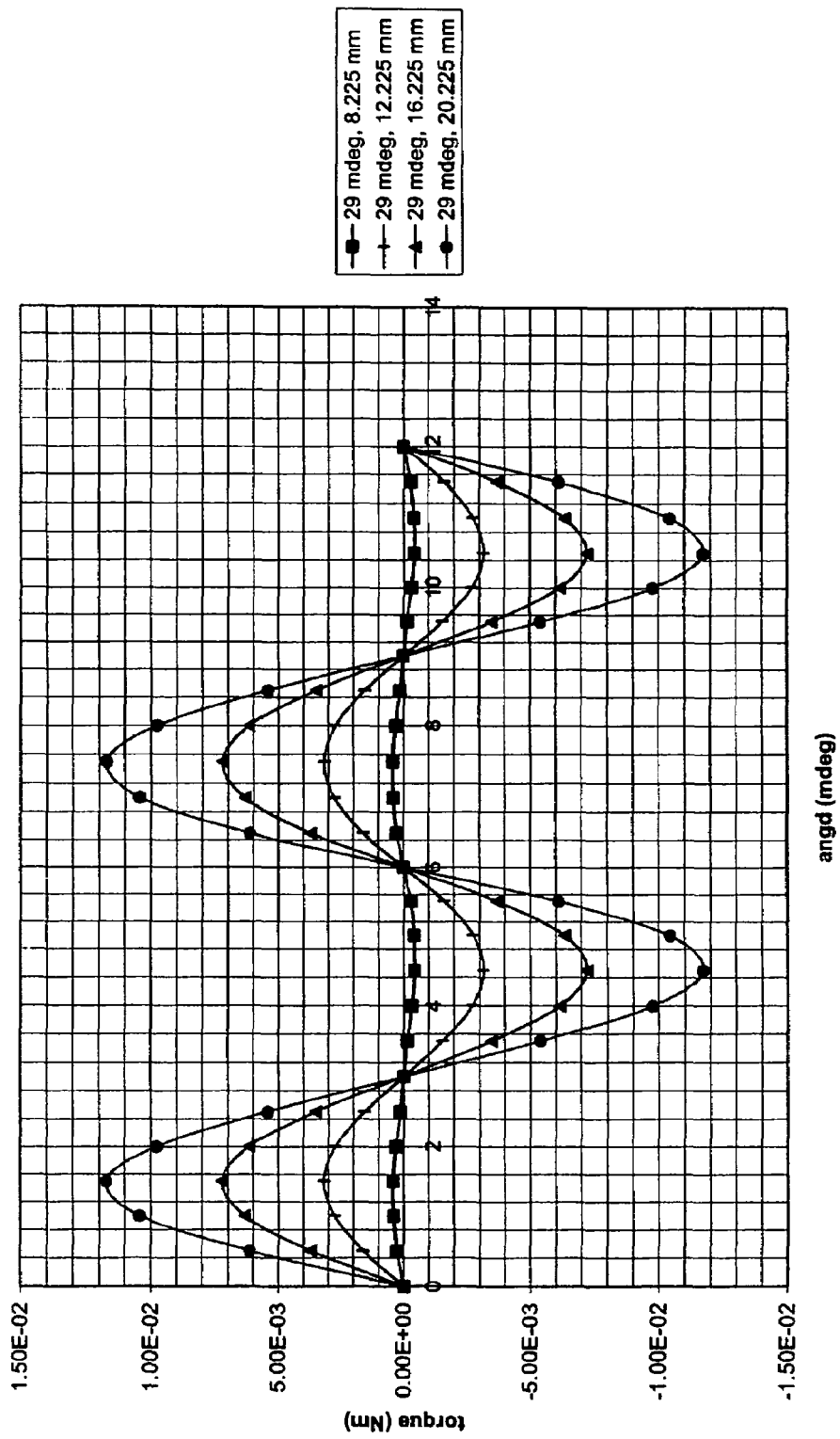
Figure 6:
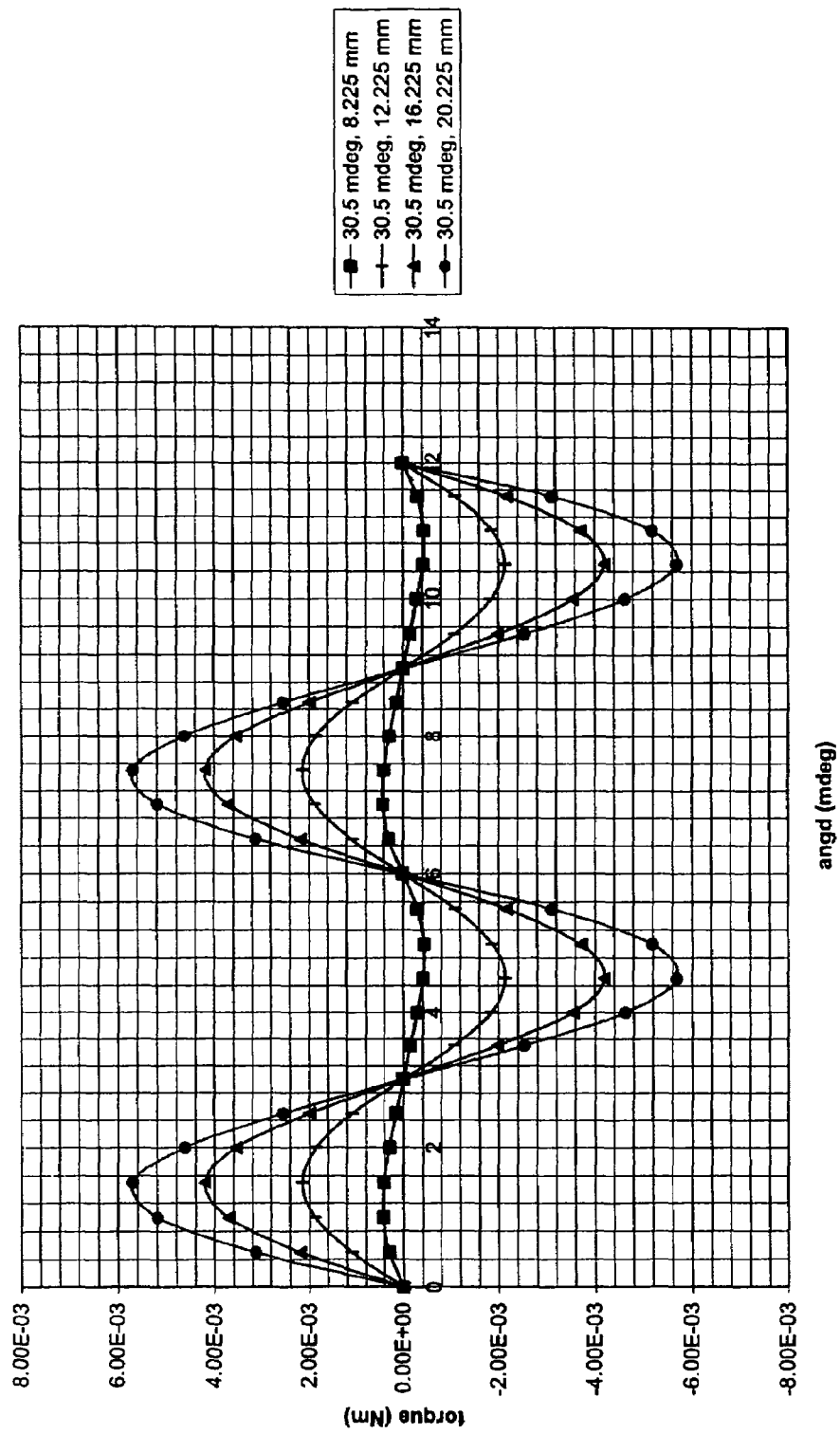

Using the FEA model and the defined value ranges for the design parameters BetaM and Rmo, cogging in the electric motor is predicted as a function of the design parameters. In one preferred embodiment, peak-to-peak cogging (i.e., torque as a function of angular position) is first predicted and plotted. This is shown generally in FIGS. 3–7, which are predicted cogging plots for the electric motor for various values of BetaM and Rmo. Specifically, FIG. 3 illustrates cogging plots using a value of 26 mechanical degrees for BetaM, and Rmo values of 8.225, 12.225, 16.225, and 20.225 millimeters. FIGS. 4–7 illustrate similar plots using the same values for Rmo, and values of 27.5, 29, 30.5 and 32 mechanical degrees, respectively, for BetaM.

Using data points from the predicted cogging plots of FIGS. 3–7, cogging in the electric motor can be predicted and plotted as a function of the design parameters, as shown in FIG. 8. More specifically, in FIG. 8, peak-to-peak cogging is plotted as a function of the value of BetaM for each of the four values of Rmo used in FIGS. 3–7.

Having predicted peak-to-peak cogging as a function of the design parameters BetaM and Rmo, values for these design parameters can be selected which correspond to a desired level of cogging in the electric motor. For example, it can be seen from FIG. 8 that using a BetaM value of 27 mechanical degrees and an Rmo value of 8.225 mm yields a predicted cogging value of zero. Alternatively, values can be selected for the design parameters BetaM and Rmo which correspond to a higher level of predicted cogging, if desired.

Figure 7:
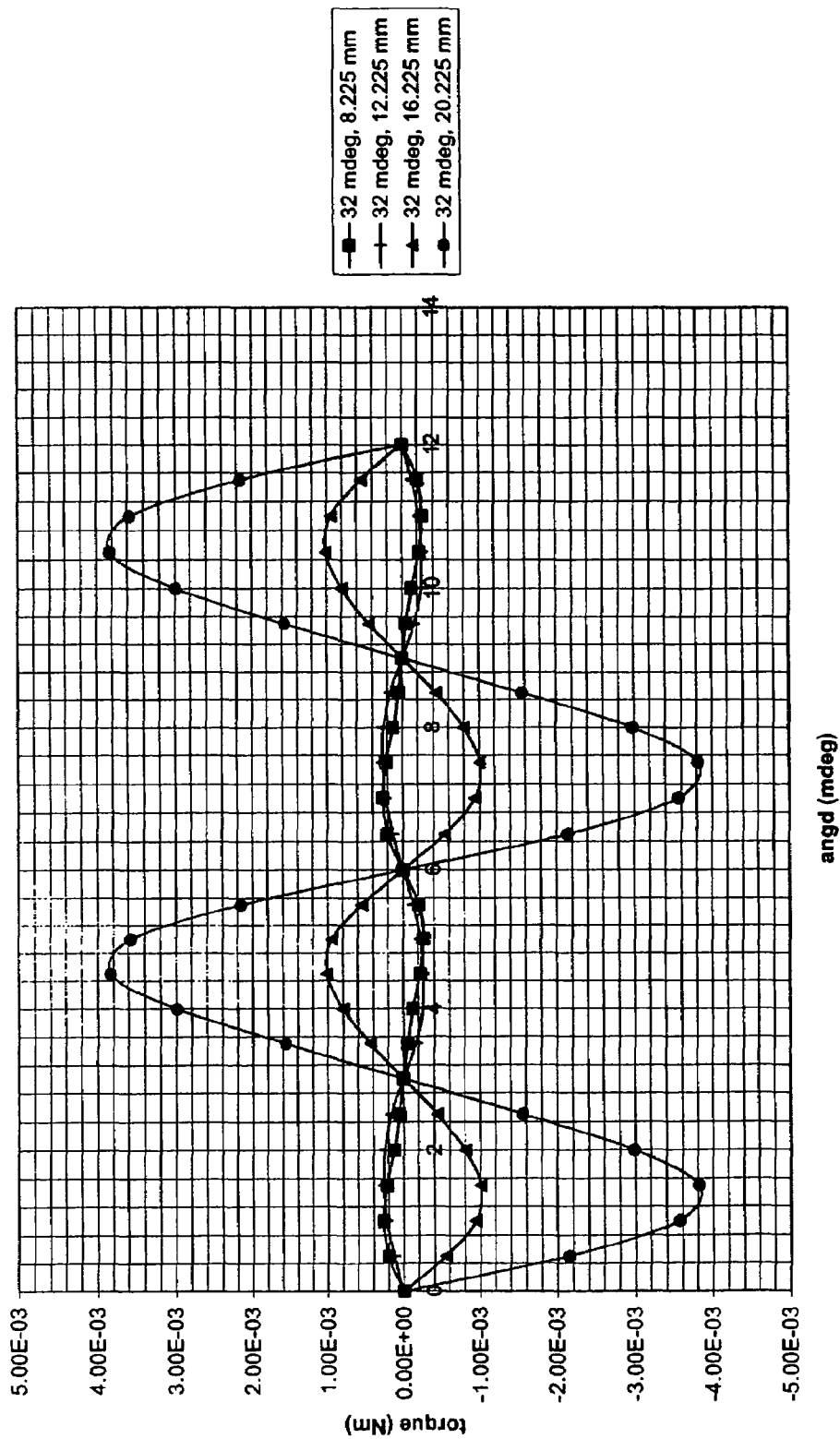

With further reference to FIG. 7, it should be noted that the predicted cogging plots are generally sinusoidal. Therefore, an equation can be derived to define a relationship between the design parameters which yields a desired level of cogging in the electric motor, as follows:

Cogging=$f$(parameter1, parameter2, . . . )

=$f1$(parameter1, parameter2, . . . )*sin($f2$(parameter1, parameter2, . . . )

In the case where zero cogging is desired, the relationship can be reduced as follows:

0=sin($f2$(parameter1, parameter2, . . . ), or

180$n$=sin($f2$(parameter1, parameter2, . . . ), where n is an integer representing a particular zero crossing of the sinusoidal cogging waveform.

Using values of BetaM and Rmo from FIG. 8 which correspond to zero cogging in the electric motor 200 yields the following expression:

$B_m = 6n + \pi(Rmo/Rad1)^2 - (7\pi/3)*(Rmo/Rad1) + (5\pi/3) \pm 1$ mechanical degrees.

Thus, using the above equation to select the values of BetaM and Rmo results in a magnet pole geometry for the rotor 204 shown in FIG. 2 which yields a minimum or zero peak-to-peak cogging when the rotor 204 is included in the electric motor 200 of FIG. 2. As will be appreciated by those skilled in the art, a higher value of n corresponds to a wider magnet, and thus a higher output torque for the electric motor 200. Thus, where greater torque is desired, $4 \leq n \leq 6$, where the maximum possible value of n (for the 10 pole/12 slot motor under discussion) is six.

In one preferred application of the invention, the electric motor 200 of FIG. 2 is incorporated into a power steering device 800, as shown generally in FIG. 8. By choosing values for BetaM and Rmo using the equation set forth above, cogging in the electric motor 200 is minimized, rendering it especially desirable for use in the power steering device 800.

When introducing elements of the present invention or the preferred embodiment(s) thereof, the articles "a", "an", "the" and "said" are intended to mean that there are one or more of such elements. The terms "comprising", "including" and "having" are intended to be inclusive and mean that there may be additional elements other than those listed.

As various changes could be made in the above constructions without departing from the scope of the invention, it is intended that all matter contained in the above description or shown in the accompanying drawings shall be interpreted as illustrative and not in a limiting sense.

What is claimed:

1. A rotor for an electric motor, the rotor having a diameter and comprising a plurality of permanent magnets, each of the permanent magnets having a magnet decenter radius value Rmo and a magnet pole span value $B_m$, wherein:

$B_m = 6n + \pi(Rmo/Rad1)^2 - (7\pi/3)*(Rmo/Rad1) + (5\pi/3) \pm 1$ mechanical degree, Rad1 is the diameter of the rotor, and n is an integer greater than one.

2. A rotor according to claim 1 wherein the rotor is configured for a 10 pole/12 slot BPM motor.

3. A rotor according to claim 1 wherein $4 \leq n \leq 6$.

4. An electric motor comprising the rotor of claim 1.

5. A power steering device comprising the electric motor of claim 4.

* * * * *